United States Patent [19]

Brownstein

[11] Patent Number: 4,621,271
[45] Date of Patent: Nov. 4, 1986

[54] APPARATUS AND METHOD FOR CONTROLLING A THERMAL PRINTER APPARATUS

[75] Inventor: Scott A. Brownstein, Rochester, N.Y.

[73] Assignee: Eastman Kodak Company, Rochester, N.Y.

[21] Appl. No.: 778,960

[22] Filed: Sep. 23, 1985

[51] Int. Cl.$^4$ ............................................. G01D 15/10
[52] U.S. Cl. ................................ 346/76 PH; 400/120
[58] Field of Search ................... 346/76 PH; 400/120; 219/216 PH

[56] References Cited

U.S. PATENT DOCUMENTS 4,532,523  7/1985  Tanaka .................................. 346/76
4,563,693  1/1986  Masaki .......................... 346/76 PH Primary Examiner—A. Evans
Attorney, Agent, or Firm—Raymond L. Owens

[57] ABSTRACT

A thermal printer apparatus is disclosed which includes a print head having a plurality of groups of thermal pixels. The thermal pixels in each group are simultaneously addressed in parallel. Each group is addressed a plurality of times. The apparatus selectively energizes the thermal pixels of each group when they are addressed until each thermal pixel is at a temperature where it can supply energy to a carrier member which delivered an amount of dye to a receiver which corresponds to a desired dye density in an image pixel.

7 Claims, 6 Drawing Figures

APPARATUS AND METHOD FOR CONTROLLING A THERMAL PRINTER APPARATUS

BACKGROUND OF THE INVENTION

1. Field of the Invention

The present invention relates to thermal printers wherein the selective energization of thermal pixels causes the transfer of dye to a receiver member.

2. Description of the Prior Art

In a thermal printer, a carrier containing dye is disposed between a receiver, such as paper, and a print head assembly formed of, for example, a plurality of individual thermal elements often referred to as thermal pixels or dots. When a particular thermal pixel is energized, it is heated and causes dye from the carrier to transfer to the receiver. The density, or darkness, of the printed dye is a function of the temperature of the thermal pixel and the time the carrier is heated, in other words the energy delivered from the thermal pixel to the carrier.

Thermal dye transfer printers offer the advantage of true "continuous tone" dye density transfer. This result is obtained by varying the energy applied to each thermal pixel, yielding a variable dye density image pixel on the receiver.

A conventional method of energizing thermal pixels employs pulse width modulation as will now be explained. A print head is organized into a plurality of groups of thermal pixels. The thermal pixels in each group are simultaneously addressed in parallel. Each group is addressed sequentially one at a time. The reason groups are used is that if all the thermal pixels were energized at the same time, a large and more expensive power supply would be needed. For example, if a thermal pixel were to draw 68 millamperes and 512 thermal pixels were used, the power supply would, if all thermal pixels were energized, have to produce 33.3 amperes. Therefore, the group arrangement is preferred.

When a group of thermal pixels are addressed, they are selectively energized. The thermal pixels are driven by a constant voltage. FIG. 1 shows a prior art pulse width modulation scheme used to drive a thermal pixel. The maximum time a current pulse can be provided to a thermal pixel is $(t_1 - t_0)$. This will produce the maximum density dye image pixel. If the pulse width is made smaller $(t_b - t_0)$, then a less dense image pixel will be formed. If a still smaller pulse width $(t_a - t_0)$ is used then an even lower dye density image pixel will be formed. Such an arrangement presents several drawbacks. Generally all thermal pixels in a print head are not driven simultaneously, but are addressed in separate "groups". Thus when a group is undergoing a heat cycle, all other groups are either "cold" or cooling. Carrier heat resisting or slipping layers applied to the head side of the carrier must therefore continue to perform well under both hot and cold conditions. This makes the design of the slipping layer difficult since a designer must optimize both "hot" and "cold" slipping performance. Layers that may function well under hot conditions may tend to aggregate or stick to the print head when run with cold surfaces. This difficulty complicates the design of the slipping layer.

A second problem involves the surface temperature of the thermal pixels along the print head. A thermal pixel in the middle of a group that is being addressed and energized generally has neighbors on both sides that are warm. As such, the temperature profile of the thermal pixel itself as well as any interpixel gap in this group tends to average to some level, since the temperature gradients in the print head will tend to equilibrate. The temperature of a thermal pixel on the end of a group can be significantly reduced due to the heat flow to the cold thermal pixels of the adjacent group which is not being addressed and energized. When dye images are transferred with such a printer, low density streaks, or "group lines" can often appear due to cold end thermal pixels.

An obvious solution to this problem would be to run all the thermal pixels of the print head at once, eliminating the existence of these cold spots. However, two factors make such a scheme rather impractical. First, as discussed above, thermal pixels draw significant currents. If one were to drive all thermal pixels simultaneously, head currents would be increased by a multiplicative factor equal to the number of groups. This causes difficult design constraints on both the power supply as well as the design of power buses within the head.

When a thermal pixel is energized for an extended period of time (say 4 milliseconds or more), limited thermal conductivity within the pixel itself results in rather large temperature gradients across its surface. Thus very high peak temperatures (hot spots) are experienced in the center of the thermal pixel, while the outside regions of the pixel remain relatively cool, due to thermal lag. As a result, damage to the thermal pixel or the carrier or the receiver can result since very high peak temperatures can be reached. For example, such hot spots can cause melted regions of the carrier or receiver or reduced life of the thermal pixels.

SUMMARY OF THE INVENTION

It is an object of this invention to provide a thermal printer which corrects the problems set forth above especially eliminating group line effects and damage caused by thermal pixel hot spots.

This object is achieved by printer apparatus including a print head having a plurality of groups of thermal pixels, the thermal pixels of each group being simultaneously addressable in parallel. The apparatus further includes means for addressing the pixels of each group a plurality of times and means for selectively energizing the thermal pixels of each group when they are addressed to increase their temperatures such that each thermal pixel can supply energy which substantially corresponds to a desired density in an image pixel.

A feature of this invention is that thermal pixels will have more uniform temperature distribution and more dye can be transferred without damage to the printer apparatus components.

Another feature of this invention is that current loads are reduced.

An advantage is that by energizing thermal pixels a plurality of times, group lines can be eliminated.

DESCRIPTION OF THE PREFERRED EMBODIMENT

Figure 1:
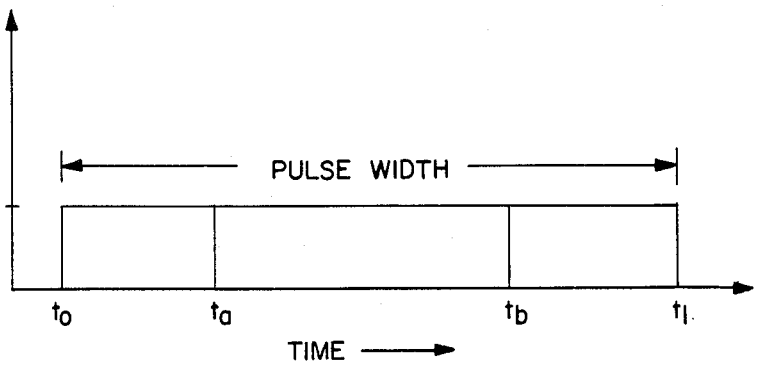
FIG. 1 illustrates a pulse width modulation scheme used in prior art thermal printers.
Figure 2:
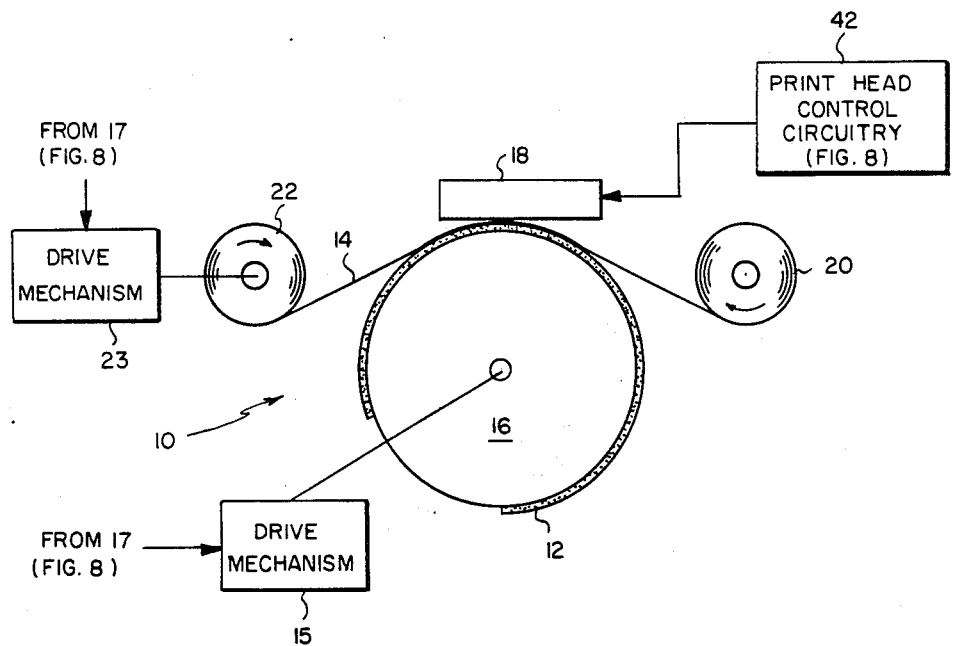
FIG. 2 is a schematic of a thermal printer apparatus which can be employed in accordance with the invention.

Referring now to FIG. 2, there is shown in schematic form a printer apparatus 10 which is adapted to print color images on a receiver member 12 from dyes transferred from a carrier member 14. The receiver member 12, in the form of a sheet is secured to a rotatable drum 16 which is mechanically coupled to a drive mechanism 15. It will be understood that the drive mechanism 15 includes a motor adapted to advance the drum 16 and receiver sheet 12, under a thermal print head 18. The print head 18 has a plurality of thermal pixels (see FIG. 4) which press the carrier member 14 against the receiver sheet. The carrier member 14 is shown in the form of a web and is driven from a supply roller 20 onto a take-up roller 22 by a drive mechanism 23 coupled to the take-up roller 22. The drive mechanisms 15 and 23 each include motors which continuously advance the carrier and the receiver relative to the thermal pixels of the print head 18. During printing while the thermal pixels are being energized, these members are moved such that the resultant dye image pixel will be somewhat larger than if they were stationary during dye transfer. This is advantageous since it minimizes discernable interpixel image boundaries. Also it reduces sticking of the carrier to the thermal pixels in the print head. As will be clear to those skilled in the art, the motors in the mechanisms 15 and 23 can be continuous DC motors. Alternatively, stepper motors can be used. If stepper motors are used, then they will be continuously pulsed to incrementally advance the carrier and the receiver. The thermal pixels are controlled by a circuit 42 which will be discussed later.

Figure 3:
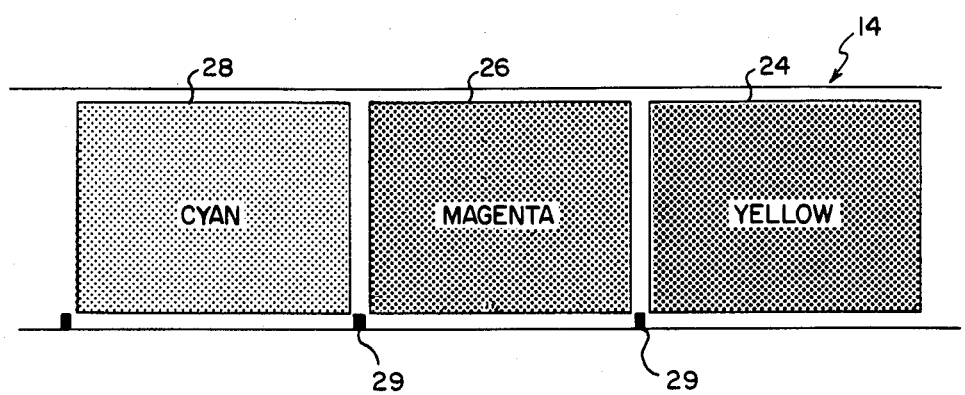
FIG. 3 is a top view of a carrier for use in the thermal printer apparatus of FIG. 2.

In FIG. 3, the web 14 is shown formed with a repeated sequence of respective sections, or frames, of thermally transferable dye. Each frame in a sequence has a different color heat transferable dye. For example, each sequence of frames may include a frame of yellow thermally transferable dye 24, followed by a frame of magenta thermally transferable dye 26, followed by a frame of cyan thermally transferable dye 28. This sequence of yellow, magenta and cyan frames is repeated. In the preferred embodiment, the dye is a material which transfers from a carrier to a receiver in response to energy applied thereto by the individual thermal pixels of the print head 18. The dyes are transferred to the receiver sheet 12. Reference marks 29 can be used in the well known manner in the control of the operation of the drive mechanism 23.

With reference to FIG. 2, the operation of apparatus 10 will be briefly described. Drive signals are continuously provided to the drive mechanism 15 from a microcomputer 17 (see FIG. 6) to rotate the drum 16 to bring successive, contiguous areas of the receiver sheet 12 into the print region opposite print head 18. A portion of a dye frame of carrier member 14 is disposed between the print head 18 and the receiver sheet 12. As noted above, these members are moved relative to the print head during the print operation. Energized signals are supplied to thermal pixels of the print head 18 by print head control circuitry 42 heating the thermal pixels and causing dye to transfer from the carrier member 14 to the receiver 12.

As the receiver member 12 moves through the print region, the selective energization of thermal pixels results in the printing of a color image on the receiver. The color of this image is determined by the color of the thermally transferable dye contained in each frame that is driven past the print region. After one complete color frame of the image has been printed, receiver 12 is returned to an initial, or "home" position. Carrier member 14 is advanced to move another color frame into position for printing, and print head 18 is selectively energized so as to print the next color frame of the image superimposed onto the first printed image.

Figure 4:
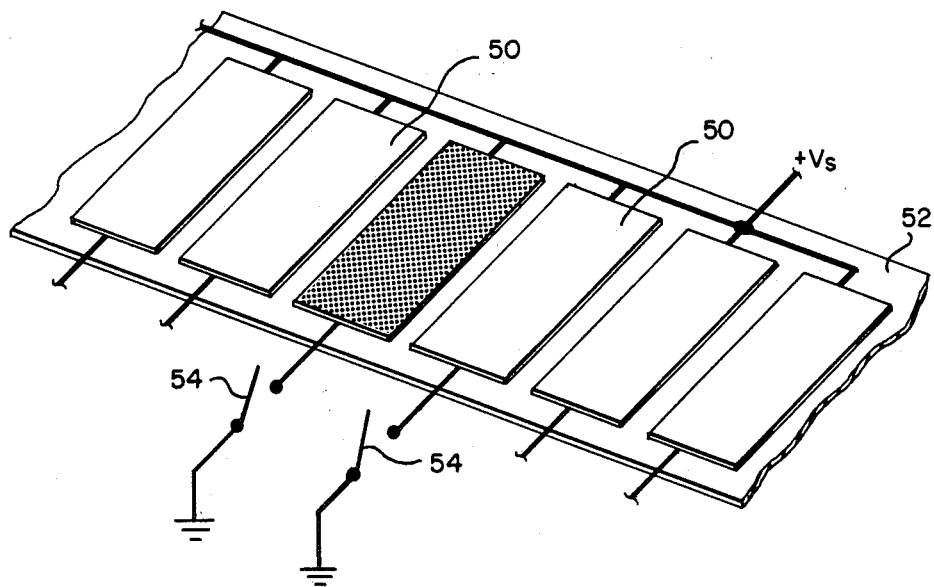
FIG. 4 is a perspective of several thermal pixels used in the print head of the apparatus of FIG. 2.

FIG. 4 shows in schematic several thermal pixels 50. Each thermal pixel 50 is made of a thin film of a resistive material, which is mounted on a non-conductive support 52. When a switch 54 is closed, current flows through the thermal pixel. Although thin film thermal pixels are shown, it will be understood that thick film thermal pixels can also be used.

Figure 6:
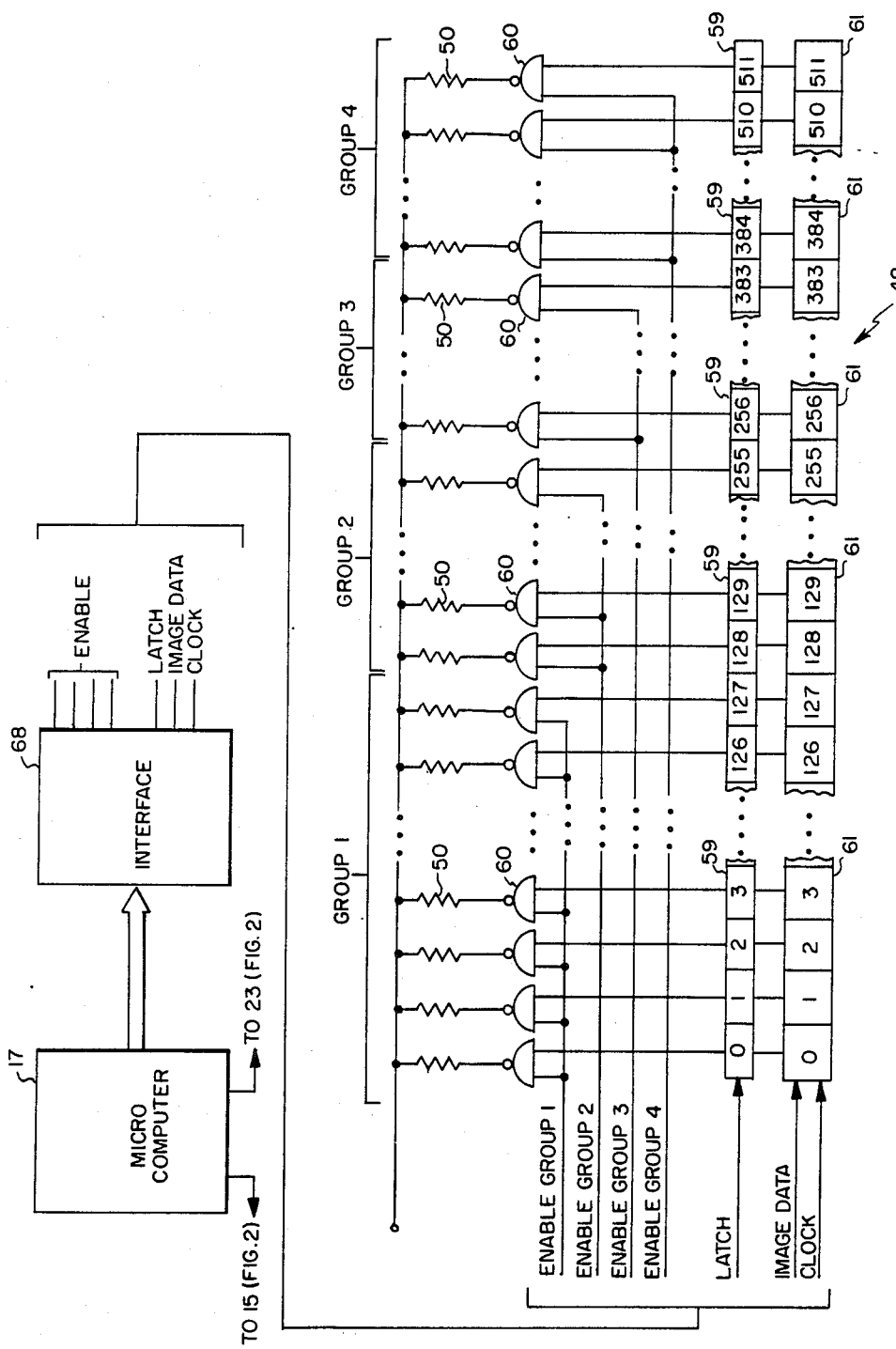
FIG. 6 is a schematic of the control system for operating the thermal pixels in the print head.

FIG. 6 illustrates in more detail the control circuit 42 by which print head 18 is selectively energized to print the respective, superimposed color frames of an image on a receiver 12. The print head assembly is energized in response to color signals that represent a line of a "still" frame of a picture. These signals are stored as color digital images in the memory of microcomputer 17. As a numerical example, the print head assembly can be formed of 512 individual thermal pixels 50. One line at a time is printed. If each printed line corresponds to a column in a video image, then one thermal pixel is used for each horizontal line of the image to be printed. Each thermal pixel 50 is shown as a box containing a resistor. The first 128 thermal pixels (0–127) are assigned to Group 1. The next 128 thermal pixels (128–255) are assigned to Group 2. Groups 3 and 4 are each assigned 128 thermal pixels. Each thermal pixel is electrically connected to a constant voltage power supply (shown as $V_s$) and a NAND gate 60. When both inputs to a NAND gate 60 are high, the output of the NAND gate 60 is connected to ground and a current pulse is generated. One input to each NAND gate is from a group enable signal and the other input is from a stage of a series of flip-flop latches 59 which contains 512 stages, one for each NAND gate. The latches are connected in parallel to the 512 stages of a shift register 61.

Figure 5:
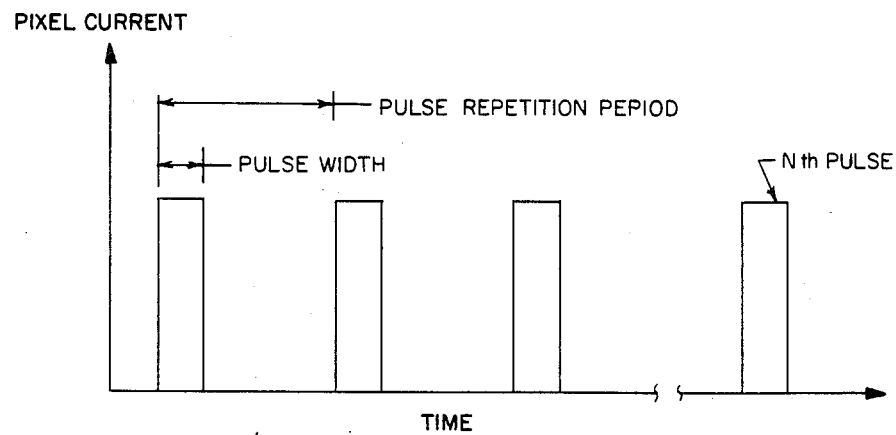
FIG. 5 illustrates the current pulses used to drive a thermal pixel in accordance with the invention.

FIG. 5 shows the current pulses applied to a single thermal pixel 50. The pulse width is the time period a group enable signal is on. After all the groups have been addressed one time the above process is repeated $N-1$ times. After data are latched in the latches 59, a new line of data are entered into the 512 shift register stages. This process of entering data in the shift register can take place while thermal pixels are being energized. As shown in FIG. 5, the duty cycle of a thermal pixel is that time equal to the pulse width divided by the repetition period.

In operation, interface 68 under the control of the microcomputer 17 provides clock signals to the shift register 61. At the same time a binary image data signal is clocked into the stages of the shift register 61 until all 512 stages either contain a high "1" or a low "0" signal level or state. A latch signal causes the data in each of the shift register stages to be entered into the corresponding stages of the latches 59. A high signal level signal held on the output of its latch stage is connected to its corresponding NAND gate 60. The thermal pixels of each group are simultaneously addressed (the group enable signal is high) in parallel. Each group is addressed in sequence. So after the group 1 enable signal is turned low, only group enable signal 2 is turned high (the others are low). Since there are four groups, this process takes place four times. At this point all thermal pixels 50 can be energized one time depending on the state of their corresponding latch stages. Now let us assume there are 64 possible dye density levels. The shift register 61 will have to be loaded with data at least 64 times. Each group of thermal pixels will be addressed at least 64 times. Each thermal pixel will be selectively energized 64 or less times depending upon the desired pixel dye density.

Since the print head consists of four groups, each group is addressed in succession for a very short time, eliminating the major current loads which would result from driving all pixels simultaneously. However, since thermal decay of the thermal pixels has a relatively long time constant, thermal pixels at the end of a group will see a heated neighboring thermal pixel and group lines will be reduced. For example, consider a system where maximum density is achieved with a conventional constant current pulse modulation system where the pulse width is 4 milliseconds and 4 drive groups are configured. The total line time with such a head would be 16 milliseconds assuming a pixel duty cycle of 25%. In order to produce $D_{max}$ under these same conditions using the FIG. 6 circuitry, each group could be addressed and energized eight separate times for 0.5 milliseconds. In effect, the individual thermal pixels would be heated for the total line time of 16 milliseconds and $D_{max}$ would result. With certain arrangements, some small increase in peak drive current might be necessary to offset any increase in thermal losses.

The present invention produces a "continuous tone" dye image with each image pixel having a predetermined number (N) of possible density levels. For 64 density levels in 16 milliseconds, the drive pulses must be no longer than about $62\mu$ seconds to enable a $D_{max}$ thermal pixel to receive 64 discrete drive pulses. However, a more reasonable time to print a line is to use 32 milliseconds, which permits the use of longer (time) group enable signals. Also a lower supply voltage $V_s$ can be used. By using a number of current pulses to drive each thermal pixel, the thermal pixel surface will have a more uniform temperature distribution thereby reducing hot spots.

The invention has been described in detail with particular reference to a certain preferred embodiment thereof, but it will be understood that variations and modifications can be effected within the spirit and scope of the invention. For example, the heat transferable dye can be a sublimable dye, or a diffusion dye or any other dye that can be subject to transfer by heat. Also, the carrier and receiver could be combined into a single unit such as in direct thermal transfer where the dye is included in a paper receiver.

I claim:

1. In a thermal printer apparatus including a print head having a number of thermal pixels, one for each image pixel, formed into a plurality of groups of thermal pixels, the thermal pixels of each group being simultaneously addressable in parallel and having N different possible temperature levels, the improvement comprising:

a. a storage device having a plurality of stages, one for each thermal pixel;
    b. means for sequentially storing N digital signals in the stages of the storage device, in which the state of each stage corresponds to whether or not a corresponding thermal pixel is to be energized;
    c. means for sequentially addressing the groups of thermal pixels each time a digital signal is stored in the storage device with each group of thermal pixels being addressed N times; and
    d. means for selectively energizing each thermal pixel each time it is addressed depending upon the state of its corresponding stage until each thermal pixel is at one of N possible temperatures.

2. Thermal printing system for forming a continuous tone color image composed of dye image pixels, each image pixel having N different possible dye density levels, comprising:

a. a thermal print head for printing a line of dye image pixels at a time and including a plurality of groups of thermal pixels, the thermal pixels of each group being simultaneously addressable in parallel, each thermal pixel corresponding to an image pixel in a line, and each thermal pixel being adapted when addressed to be selectively energized;
    b. a carrier including at least one heat transferable dye and being positionable in relation to the thermal pixels such that the amount of dye sublimed for each image pixel is proportional to the energy provided by an energized thermal pixel;
    c. a receiver disposed in relation to the carrier sheet and the print head for receiving sublimed dye to form dye image pixels;
    d. a storage device having a plurality of states, one for each thermal pixel;
    e. means for sequentially storing N digital signals in the stages of said shift register in which the state of each stage corresponds to whether or not a corresponding thermal pixel is to be energized;
    f. means for sequentially addressing the groups of thermal pixels, one for each time a digital signal is stored in said shift register such that each group of thermal pixels is addressed N times; and
    g. means for selectively energizing each thermal pixel each time it is addressed depending upon the state of its corresponding storage device stage until each thermal pixel is at one of N possible temperatures and which causes dye to transfer from the carrier and be received by the receiver at a desired dye density level.

3. A method of forming a continuous tone color image composed of dye image pixels, each image pixel having N different possible dye density levels, comprising the steps of:

a. positioning a carrier having transferable dye and a receiver for receiving transferred dye relative to a print head which includes a plurality of groups of thermal pixels, with the thermal pixels of each group being simultaneously addressable in parallel;
    b. sequentially addressing the groups of thermal pixels such that each group of thermal pixels is addressed N times; and
    c. selectively energizing the thermal pixels each time they are addressed until each thermal pixel is able to deliver energy which corresponds to a particular one of the N dye densities.

4. A method of forming a continuous tone color image composed of dye image pixels, each image pixel having N different possible dye density levels, comprising the steps of:
- a. moving a carrier having transferable dye and moving receiver for receiving transferred dye relative to a print head which includes a plurality of groups of thermal pixels, with the thermal pixels of each group being simultaneously addressable in parallel as the carrier and receiver are being moved;
- b. sequentially addressing the groups of thermal pixels such that each group of thermal pixels is addressed N times; and
- c. selectively energizing the thermal pixels each time they are addressed until each thermal pixel is able to deliver energy which corresponds to a particular one of the N dye densities.

5. A method of forming a continuous tone color image composed of dye image pixels, each pixel having N different dye density levels, comprising the steps of:
- a. positioning a carrier sheet having transferable dye and a receiver for receiving transferred dye relative to a print head which includes a plurality of groups of thermal pixels, with the thermal pixels of each group being simultaneously addressable in parallel;
- b. sequentially storing N digital signals in the stages of a storage device in which the state of each stage corresponds to whether or not a corresponding thermal pixel is to be energized;
- c. sequentially addressing the groups of thermal pixels each time a digital signal is stored in the storage device such that each group of thermal pixels is addressed N times; and
- d. selectively energizing each thermal pixel each time it is addressed depending upon the state of its corresponding stage until each thermal pixel is at one of N possible temperatures which corresponds to a desired dye density, such that a color image with the desired dye density image pixels is formed in the receiver.

6. A method of forming a continuous tone dye image composed of a predetermined number of image pixels, each pixel having N different dye density levels, comprising the steps of:
- a. positioning a carrier sheet having transferable dye and a receiver for receiving transferred dye relative to a print head having the predetermined number of thermal pixels, one for each image pixel, formed into plurality of groups of thermal pixels, with the thermal pixels of each group being simultaneously addressable in parallel;
- b. sequentially storing N digital signals in stages of a shift register in which the state of each stage corresponds to whether or not a corresponding thermal pixel is to be energized;
- c. sequentially addressing the groups of thermal pixels each time a digital signal is stored in the storage device such that each group of thermal pixels is addressed N times; and
- d. selectively energizing each thermal pixel each time it is addressed depending upon the state of its corresponding shift register stage until each thermal pixel is at one of N possible temperatures which corresponds to a desired dye density, such that a color image with the desired dye density image pixels is formed in the receiver.

7. Thermal printing apparatus for forming a continuous tone dye image composed of dye image pixels, each image pixel having N different possible dye density levels, comprising:
- a. a thermal print head for printing a line of image pixels and including a plurality of groups of thermal pixels, the thermal pixels of each group being simultaneously addressable in parallel, each thermal pixel corresponding to an image pixel in a line, and each thermal pixel being adapted when addressed to be selectively energized;
- b. a member including at least one heat transferable dye and being positionable in relation to the thermal pixels such that the amount of dye transferred for each image pixel is proportional to the energy provided by an energized thermal pixel; and
- c. means for controlling image dye density including (i) means for serially addressing each pixel group N times and (ii) means for selectively energizing each thermal pixel of a group when addressed until each thermal pixel is able to deliver energy to the member to cause dye to transfer such that the desired image pixel dye densities in a line of image pixels are formed.

* * * * *